United States Patent
Fukasawa

(10) Patent No.: US 11,912,299 B2
(45) Date of Patent: Feb. 27, 2024

(54) VEHICLE SYSTEM

(71) Applicant: TOYOTA JIDOSHA KABUSHIKI KAISHA, Toyota (JP)

(72) Inventor: Tsukasa Fukasawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 35 days.

(21) Appl. No.: 17/870,392

(22) Filed: Jul. 21, 2022

(65) Prior Publication Data

US 2023/0022348 A1    Jan. 26, 2023

(30) Foreign Application Priority Data

Jul. 26, 2021  (JP) .................................. 2021-121475

(51) Int. Cl.
| | |
|---|---|
| *B60W 10/20* | (2006.01) |
| *B60W 60/00* | (2020.01) |
| *B62D 5/04* | (2006.01) |
| *B60W 40/072* | (2012.01) |
| *B60W 10/184* | (2012.01) |
| *B60W 50/02* | (2012.01) |
| *B60W 40/04* | (2006.01) |

(52) U.S. Cl.
CPC ........ *B60W 60/001* (2020.02); *B60W 10/184* (2013.01); *B60W 10/20* (2013.01); *B60W 40/04* (2013.01); *B60W 40/072* (2013.01); *B60W 50/0205* (2013.01); *B62D 5/046* (2013.01); *B62D 5/0481* (2013.01)

(58) Field of Classification Search
CPC .. B60W 60/001; B60W 10/184; B60W 10/20; B60W 40/04; B60W 40/072; B60W 50/0205; B62D 5/046; B62D 5/0481; B62D 5/0484

USPC .......................................................... 701/23
See application file for complete search history.

(56) References Cited

U.S. PATENT DOCUMENTS 10,988,142 B1 *  4/2021  Mehrotra ............ B60W 40/068

FOREIGN PATENT DOCUMENTS

| | | | | |
|---|---|---|---|---|
| DE | 10236331 A1 | * | 2/2004 | ............ B60T 8/1755 |
| DE | 102004023497 A1 | * | 12/2004 | ............... B60T 7/12 |
| EP | 0728644 B1 | * | 9/1996 | |
| JP | 2020-089080 A | | 6/2020 | |

* cited by examiner

*Primary Examiner* — B M M Hannan
(74) *Attorney, Agent, or Firm* — Sughrue Mion, PLLC

(57) ABSTRACT

A vehicle system, including: a steering system; and a longitudinal-force application system including longitudinal-force application actuators configured to apply longitudinal forces respectively to one or more left-side wheels and one or more right-side wheels and a longitudinal-force controller configured to control the longitudinal-force application actuators to control the longitudinal forces applied respectively to the one or more left-side wheels and the one or more right-side wheels, and an onboard power source device including a main power source and a secondary power source. When the main power source fails to supply electric power to the longitudinal-force application system and the steering system, the longitudinal-force controller controls the longitudinal-force application actuators to control a difference between the longitudinal force applied to the one or more left-side wheels and the longitudinal force applied to the one or more right-side wheels, thereby turning the vehicle.

5 Claims, 6 Drawing Sheets

VEHICLE SYSTEM

CROSS REFERENCE TO RELATED APPLICATION

The present application claims priority to Japanese Patent Application No. 2021-121475, which was filed on Jul. 26, 2021, the disclosure of which is herein incorporated by reference in its entirety.

BACKGROUND

Technical Field

The following disclosure relates to a vehicle system equipped with a brake system.

Description of Related Art

Patent Document 1 (Japanese Patent Application Publication No. 2020-89080) discloses a vehicle system that includes: an onboard power source device including a main power source and a secondary power source; and a plurality of actuators configured to be operated by electric power supplied from the onboard power source device. In the disclosed vehicle system, when the main power source is abnormal, activation and deactivation (ON and OFF) of each actuator are controlled based on the voltage of the secondary power source.

SUMMARY

An aspect of the present disclosure relates to reduction in a capacity of the secondary power source.

A vehicle system according to the present disclosure includes a longitudinal-force application system and a steering system that are configured to be operated by an onboard power source device common to the two systems. In the longitudinal-force application system, a longitudinal-force controller constituted principally by a computer controls longitudinal forces respectively applied to one or more left-side wheels and one or more right-side wheels of the vehicle. In the steering system, a steering controller constituted principally by a computer controls steering angles of respective steerable wheels of the vehicle. The onboard power source device includes a main power source and a secondary power source. When the main power source is in an abnormal state in which the main power source fails to supply electric power to the longitudinal-force application system and the steering system, the longitudinal-force application system is operated by electric power supplied from the secondary power source. The longitudinal-force controller controls a difference between the longitudinal force applied to the one or more left-side wheels and the longitudinal force applied to the right-side wheels, thereby turning the vehicle. (The difference will be referred to as "left and right longitudinal force difference" where appropriate.) This configuration eliminates a need to operate the steering system for turning the vehicle, thereby reducing electric power consumed by the steering system. This configuration enables the capacity of the secondary power source to be made smaller than that in a configuration in which both the steering system and the longitudinal-force application system are operated by electric power of the secondary power source.

BRIEF DESCRIPTION OF THE DRAWINGS

The objects, features, advantages, and technical and industrial significance of the present disclosure will be better understood by reading the following detailed description of an embodiment, when considered in connection with the accompanying drawings, in which.

DETAILED DESCRIPTION OF THE EMBODIMENT

Figure 1:
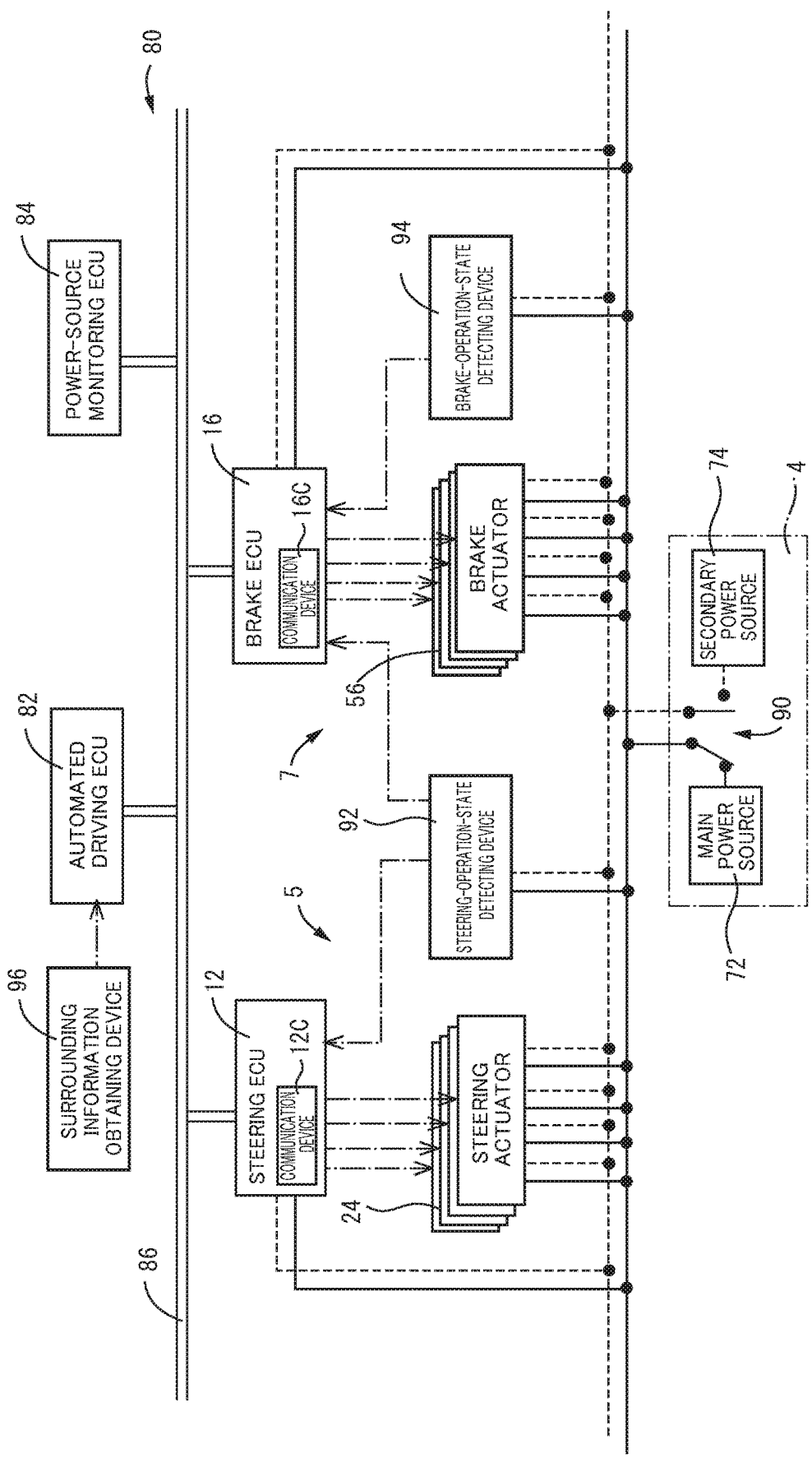
FIG. 1 is a view conceptually illustrating a vehicle system according to one embodiment of the present disclosure.

Referring to the drawings, there will be described a vehicle system according to one embodiment of the present disclosure.

The present vehicle system includes a steering system 5 and a brake system 7, which are configured to be operated by electric power supplied from an onboard power source device 4 common to the two systems 5, 7. The brake system 7 functions as a longitudinal-force application system.

Figure 2:
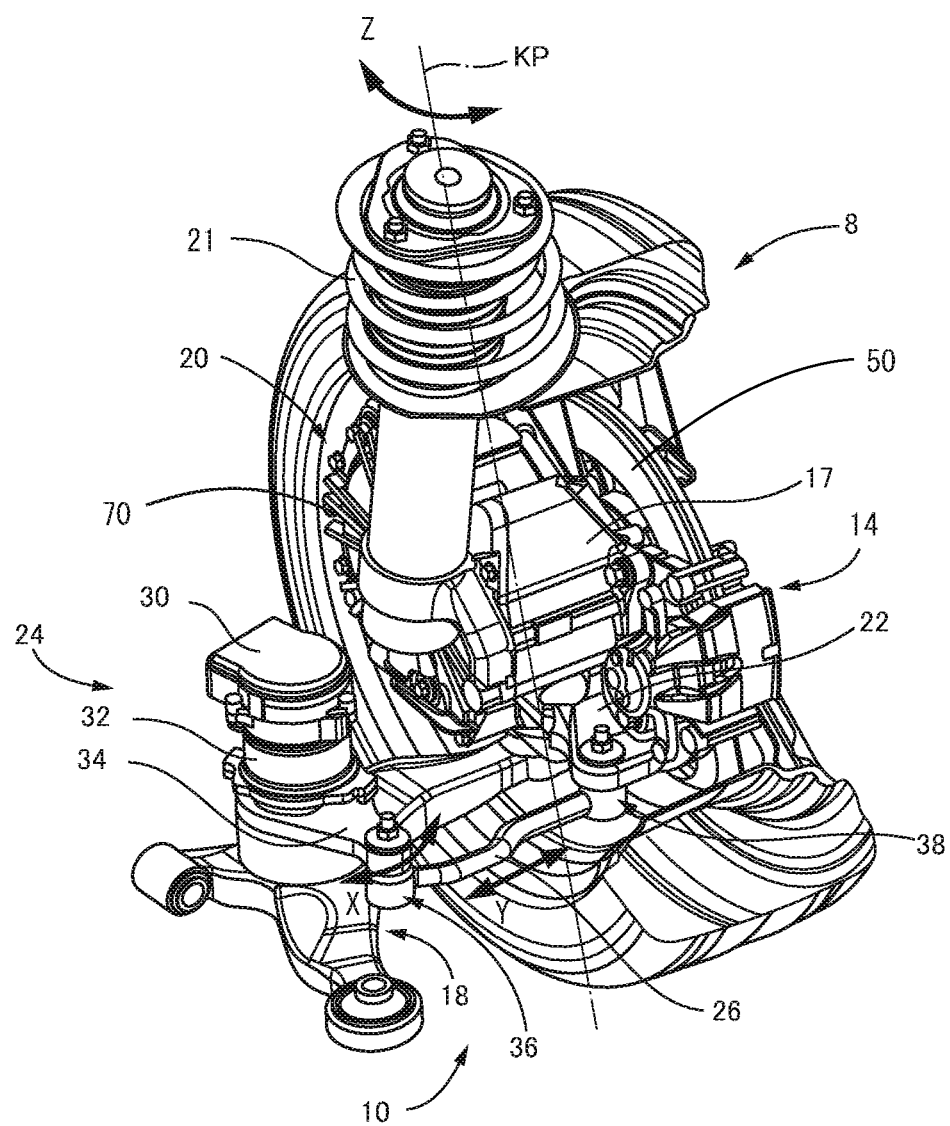
FIG. 2 is a perspective view of a steering device of the vehicle system.

The steering system 5 includes: steering devices 10 (one of which is illustrated in FIG. 2) provided for respective four wheels 8 respectively disposed at a front right portion, a front left portion, a rear right portion, and a rear left portion of a vehicle; and a steering ECU (Electronic Control Unit) 12 constituted principally by a computer and configured to control the steering devices 10. The wheels 8 will be hereinafter referred to as front and rear right and left wheels 8 where appropriate. Further, each of the wheels 8 will be simply referred to as the wheel 8 where appropriate. The steering ECU 12 functions as a steering controller and controls the steering devices 10 to thereby control steering angles of the respective wheels 8.

Figure 3:
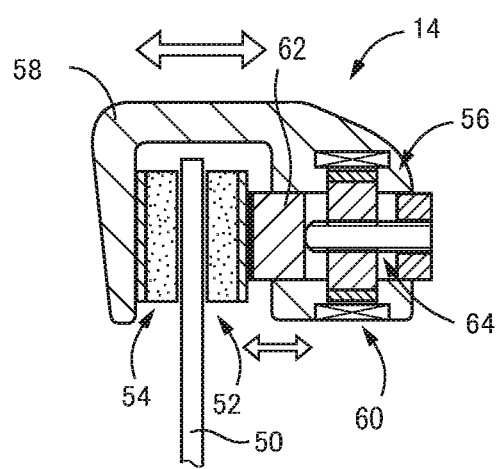
FIG. 3 is a cross-sectional view of a friction brake of the vehicle system.

The brake system 7 includes: friction brakes 14 (one of which is illustrated in FIG. 3) respectively provided for the front and rear right and left wheels 8 and a brake ECU 16 constituted principally by a computer and configured to control the friction brakes 14. The brake ECU 16 functions as a longitudinal-force controller and a braking-force controller. The brake ECU 16 controls the friction brakes 14 to thereby control braking forces, each as a longitudinal force, respectively applied to the front and rear right and left wheels 8.

Referring to FIG. 2, one example of the steering device 10 will be described.

The wheel 8 is rotatably held by a steering knuckle (hereinafter referred to as "knuckle") 17. A lower arm 18 is coupled to the knuckle 17. The lower arm 18 is coupled to a body-side member (not illustrated) via respective bushings so as to be swingable in the up-down direction (about the axis extending in the front-rear direction) and the horizontal direction (about the axis extending in the up-down direction). The knuckle 17 is supported by a body-side member (not illustrated) via a shock absorber 20 and a suspension spring 21.

The steering device 10 includes the knuckle 17, a steering actuator 24 provided on the lower arm 18, a pitman arm 34 coupled to an output shaft (not illustrated) of the steering actuator 24, and a tie rod 26 coupling the pitman arm 34 and a knuckle arm 22 of the knuckle 17.

The steering actuator 24 includes: a steering motor 30, which is an electric motor and functions as a drive source; and a speed reducer 32 configured to decelerate rotation of the steering motor 30. The pitman arm 34 is coupled at one end thereof to an output shaft of the speed reducer 32, which is the output shaft of the steering actuator 24, so as to be rotatable integrally with the output shaft of the speed reducer 32.

The other end of the pitman arm 34 is coupled to one end of the tie rod 26 via a joint 36. The other end of the tie rod 26 is coupled to the knuckle arm 22 via a joint 38.

When the steering actuator 24 of the steering device 10 is driven in a direction indicated by an arrow X in FIG. 2, the pitman arm 34 is pivoted about the axis of the steering actuator 24. The pivotal movement of the pitman arm 34 causes the tie rod 26 to be moved in a direction indicated by an arrow Y, so that the knuckle arm 22 and the knuckle 17 are rotated about the kingpin axis KR Thus, the wheel 8 is steered in a direction indicated by an arrow Z.

One example of the friction brake 14 is illustrated in FIG. 3. The friction brake 14 includes: a pair of friction pads 52, 54 each of which functions as a frictional engaging portion and which are disposed on opposite sides of a brake rotary member 50 rotatable integrally with the wheel 8; and a pressing device 56 configured to press the friction pads 52, 54 against the brake rotary member 50. The pressing device 56 includes: a caliper 58; an electric motor 60 provided in the caliper 58 and functioning as a drive source; and a motion converting device 64 configured to convert rotation of the electric motor 60 into a linear movement of a pressing member 62. In the present embodiment, though the pressing device 56 corresponds to a brake actuator that functions as a longitudinal-force application actuator for applying a longitudinal force to the wheel, it may be considered that the electric motor 60 corresponds to the brake actuator.

When the electric motor 60 is driven to move the pressing member 62, the caliper 58 is moved, so that the friction pads 52, 54 are pressed against the brake rotary member 50. The frictional engagement of the friction pads 52, 54 and the brake rotary member 50 reduces rotation of the wheel 8. By controlling the electric motor 60, a force by which the friction pads 52, 54 press the brake rotary member 50, i.e., a pressing force, is controlled to thereby control a braking force applied to the wheel 8.

As illustrated in FIG. 2, the wheel 8 is provided with an in-wheel motor 70, which applies a drive force as the longitudinal force. In the present embodiment, the housing of the in-wheel motor 70 functions as the knuckle 17. Thus, the steering device 10, the friction brake 14, and the in-wheel motor 70 are provided for each of the front and rear right and left wheels 8.

The onboard power source device 4 includes a main power source 72 and a secondary power source 74. Each of the main power source 72 and the secondary power source 74 may be a lithium ion battery, for instance. Alternatively, the main power source 72 may be a lithium ion battery, and the secondary power source 74 may be a capacitor, for instance. In either case, the secondary power source 74 typically has a capacity smaller than that of the main power source 72.

The steering actuator 24 of each steering device 10 and the brake actuator 56 of each friction brake 14 are controlled by a control device 80. The control device 80 includes, in addition to the steering ECU 12 and the brake ECU 16, an automated driving ECU 82 constituted principally by a computer and functioning as an automated driving controller and a power-source monitoring ECU 84, for instance. The steering ECU 12, the brake ECU 16, the automated driving ECU 82, and the power-source-monitoring ECU 84 are communicably connected to one another via a CAN (Controller Area Network) 86. The steering ECU 12 and the brake ECU 16 respectively include a communication device 12C and a communication device 16C, which receive information transmitted via the CAN 86.

The automated driving ECU 82, the power-source monitoring ECU 84, etc., may be powered by the onboard power source device 4 by which the steering ECU 12 and the brake ECU 16 are powered. Alternatively, the automated driving ECU 82, the power-source monitoring ECU 84, etc., may be powered by an onboard power source device different from the onboard power source device 4.

A switch 90 is provided between: the main power source 72 and the secondary power source 74; and the steering ECU 12, the brake ECU 16, the steering actuators 24, the brake actuators 56, etc., i.e., the steering system 5 and the brake system 7. Switching of the switch 90 causes one of the main power source 72 and the secondary power source 74 to be selectively connected to the steering system 5 and the brake system 7.

The steering actuators 24 provided for the respective front and rear right and left wheels 8 are connected to the steering ECU 12 via respective drive circuits not illustrated. Further, a steering-operation-state detecting device 92 is connected to the steering ECU 12. The steering-operation-state detecting device 92 is configured to detect an operation state of a steering operation member (not illustrated) operable by a driver. The operation state of the steering operation member includes a direction and an amount of the operation of the steering operation member, for instance. The steering-operation-state detecting device 92 outputs a positive value representing the operation amount of the steering operation member when it is operated in one of the rightward direction and the leftward direction and a negative value representing the operation amount of the steering operation member when it is operated in the other of the rightward direction and the leftward direction. Thus, the direction and the amount of the operation of the steering operation member can be obtained based on the value detected by the steering-operation-state detecting device 92.

The brake actuators 56 provided for the respective front and rear right and left wheels 8 are connected to the brake ECU 16 via respective drive circuits (not illustrated). Further, a brake-operation-state detecting device 94 is connected to the brake ECU 16. The brake-operation-state detecting device 94 is configured to detect, for instance, an operation amount of a brake operation member (not illustrated) operable by a driver.

A surrounding information obtaining device 96 is connected to the automated driving ECU 82. The surrounding information obtaining device 96 includes cameras, radar devices, etc., The surrounding information obtaining device 96 recognizes, based on information about images captured by the cameras, the surrounding environment of the vehicle (own vehicle) such as an object present in the surroundings of the own vehicle, a lane line of a surrounding road, and obtains information representing a relative positional relationship between the object and the own vehicle, a curved state of the road, etc. Based on the information obtained by the surrounding information obtaining device 96, the automated driving ECU 82 obtains an automatic brake request as one example of a brake request and an automatic steering request as one example of a steering request and outputs the obtained request to the CAN 86. The automatic steering request includes, for instance, information on the direction of steering and the intensity of the steering request represented by a target yaw rate or the like.

The power-source monitoring ECU 84 is configured to monitor a state of the onboard power source device 4. For instance, the power-source monitoring ECU 84 is configured to monitor, based on the voltage or the like of the main power source 72, whether the main power source 72 is in a state in which electric power is suppliable from the main power source 72 to the steering system 5 and the longitudinal-force application system 7 and to output, to the CAN 86, main-power-source information representing results of monitoring.

The main-power-source information contains: main-power-source abnormality information indicating that the main power source 72 is in a state in which electric power cannot be supplied from the main power source 72 to the steering system 5 and the brake system 7 (hereinafter referred to as an abnormal state of the main power source 72 where appropriate); and main-power-source normality information indicating that the main power source 72 is in a state in which electric power is suppliable from the main power source 72 to the steering system 5 and the brake system 7 (hereinafter referred to as a normal state of the main power source 72 where appropriate). Each of the steering system 5 and the brake system 7 may be referred to as a power consuming device.

There will be next described operations of the thus constructed vehicle system.

The switch 90 is configured to be switched between a first state and a second state described below.

When the main power source 72 is normal, the switch 90 is in the first state in which the switch 90 causes the steering system 5 and the brake system 7 to be disconnected from the secondary power source 74 and to be connected to the main power source 72. Thus, the steering ECU 12, the brake ECU 16, etc., are powered by the main power source 72.

When the communication device 12C of the steering ECU 12 receives the automatic steering request transmitted via the CAN 86 or when it is determined based on the detection value of the steering-operation-state detecting device 92 that the steering operation member is operated and the steering request (that will be referred to as "operation steering request") is made, the steering ECU 12 controls the steering actuator 24 of at least one of the front and rear right and left wheels 8 to thereby steer the at least one wheel 8. Thus, the vehicle turns.

When the communication device 16C of the brake ECU 16 receives the automatic brake request transmitted via the CAN 86 or when it is determine based on the detection value of the brake-operation-state detecting device 94 that the brake operating member is operated and the brake request (that will be referred to as "operation brake request") is made, the brake ECU 16 controls the brake actuator 56 of at least one of the front and rear right and left wheels 8 to thereby apply the braking force by the friction brake 14 to the at least one wheel 8.

When the main power source 72 is abnormal, the switch 90 is switched to the second state in which the switch 90 causes the steering system 5 and the brake system 7 to be disconnected from the main power source 72 and to be connected to the secondary power source 74.

If the steering system 5 and the brake system 7 were operated by electric power of the secondary power source 74 in the abnormal state of the main power source 72, it would be necessary to increase the capacity of the secondary power source 74. This leads to an increase in cost and size of the secondary power source 74.

The ECUs such as the steering ECU 12 and the brake ECU 16, each of which is constituted principally by a computer, require a standby current even when the steering actuator 24 and the brake actuator 56 are not operating. For instance, the steering ECU 12 reads in the detection values of the steering-operation-state detecting device 92 all the time and obtains the operation state of the steering operation member based on the detection values, so as to monitor whether the operation steering request is present. Further, the steering ECU 12 monitors the information transmitted via the CAN 86 and receives and processes the information as needed. For instance, the steering ECU 12 receives and processes the automatic steering request output from the automated driving ECU 82 and the main-power-source information output from the power-source monitoring ECU 84. It is accordingly necessary to keep supplying the standby current to the ECUs such as the steering ECU 12 and the brake ECU 16.

Here, a case is considered in which the vehicle system is configured as follows. When the main power source 72 is abnormal, the steering ECU 12 is deactivated and the brake ECU 16 determines the presence or absence of the steering request. When it is determined that the steering request is present, the steering ECU 12 is activated to control the steering actuators 24. This configuration, however, may cause a delay in steering.

In the present embodiment, therefore, when the main power source 72 is abnormal, the brake ECU 16 determines the presence or absence of the steering request, and a right and left braking force difference is controlled to turn the vehicle when it is determined that the steering request is present. Specifically, by controlling the brake actuator 56 of at least one of the front and rear right and left wheels 8, a difference between: the braking forces applied to the left-side wheels 8L illustrated in FIG. 8 (i.e., the front left wheel and the rear left wheel) disposed at the left-side portion of the vehicle; and the braking forces applied to the right-side wheels 8R illustrated in FIG. 8 (i.e., the front right wheel and the rear right wheel) disposed at the right-side portion of the vehicle is controlled to thereby turn the vehicle. With this configuration, the delay in steering is prevented or reduced. The left-side wheels 8L may include at least one of the front left wheel and the rear left wheel while the right-side wheels 8R may include at least one of the front right wheel and the rear right wheel.

Consequently, the steering ECU 12 simply needs to have at least a function of receiving and processing power source information supplied thereto via the CAN 86. (This function will be hereinafter referred to as a communication function where appropriate.) This obviates electric power or the like for determining based on the detection value of the steering-operation-state detecting device 92 whether the operation steering request is present, thus reducing the standby current supplied to the steering ECU 12.

Further, the configuration described above obviates electric power or the like for operating the steering actuators 24.

Thus, the capacity of the secondary power source 74 can be made smaller, resulting in a size reduction of the secondary power source 74.

Figure 4:
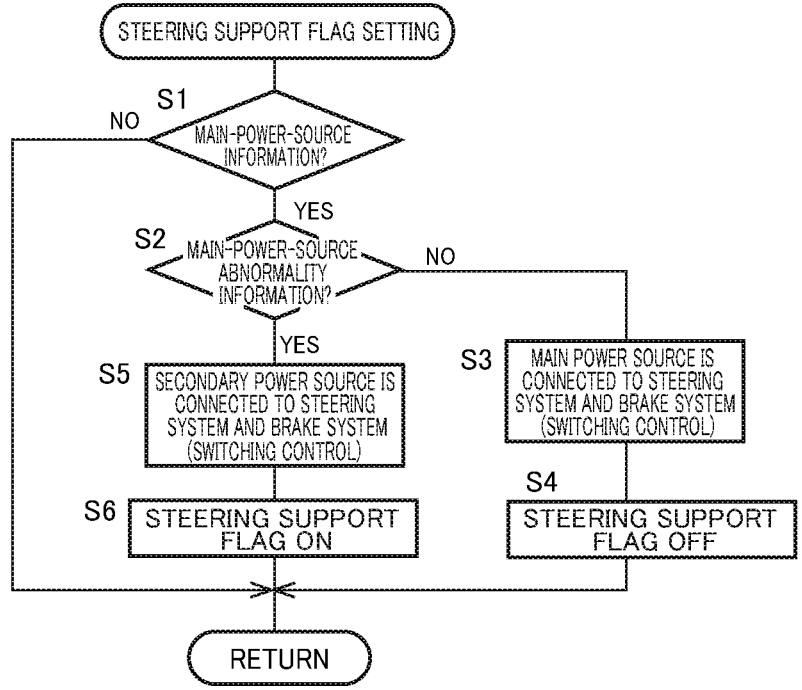
FIG. 4 is a flowchart representing a steering-support-flag setting program stored in a storage of a control device of the vehicle system.

A steering-support-flag setting program represented by a flowchart of FIG. 4 is executed by the brake ECU 16 at intervals of a predetermined cycle time.

At Step 1, it is determined whether the communication device 16C has received main-power-source information supplied by the power-source monitoring ECU 84 via the CAN 86. (Hereinafter, Step 1 will be abbreviated as "S1". Other steps will be similarly abbreviated.) When an affirmative determination (YES) is made at S1, it is determined at S2 whether the received information is the main-power-source abnormality information. When a negative determination (NO) is made at S2, namely, when the received information is the main-power-source normality information, the control flow proceeds to S3 at which the switch 90 is placed in the first state to cause the main power source 72 to be connected to the steering system 5 and the brake system 7. At S4, a steering support flag is set to OFF. The steering support flag is a flag that is set to ON when the brake ECU 16 needs to execute the control for turning the vehicle, in place of the steering ECU 12.

When the received information is the main-power-source abnormality information, an affirmative determination (YES) is made at S2. The control flow then proceeds to S5 at which the switch 90 is switched to the second state to cause the steering system 5 and the brake system 7 to be disconnected from the main power source 72 and to be connected to the secondary power source 74. At S6, the steering support flag is set to ON.

Figure 5:
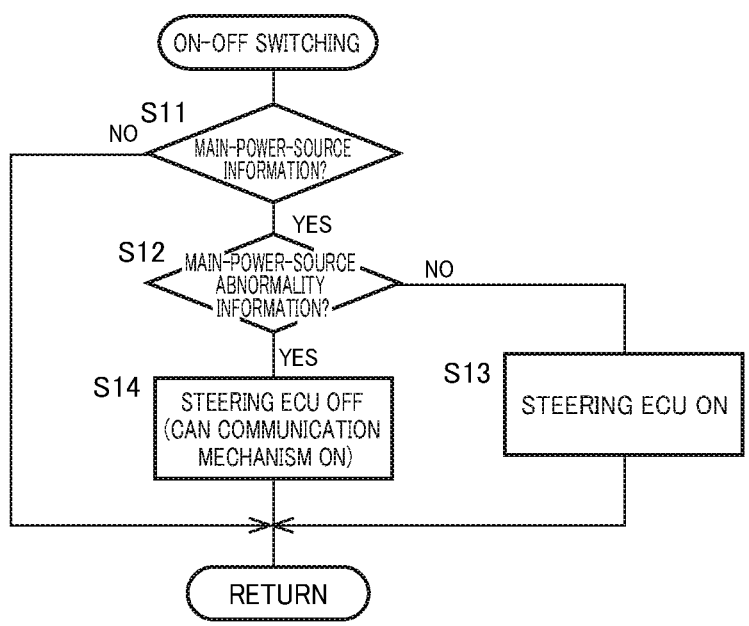
FIG. 5 is a flowchart representing an ON and OFF switching program stored in the storage of the control device of the vehicle system.

An ON-OFF switching program represented by a flowchart of FIG. 5 is executed by the steering ECU 12 at intervals of a predetermined cycle time.

At S11, it is determined whether the communication device 12C has received the main-power-source information supplied via the CAN 86. At S12, it is determined whether the received information is the main-power-source abnormality information. When a negative determination (NO) is made at S12, the control flow proceeds to S13 at which the steering ECU 12 is activated to ON. When an affirmative determination (YES) is made at S12, the control flow proceeds to S14 at which a portion of the steering ECU 12 except the communication device 12C is deactivated to OFF. The steering actuators 24 are also deactivated to OFF.

The ON-OFF switching program represented by the flowchart of FIG. 5 is executed also when the main power source 72 is in the abnormal state. Thus, in a case where the main power source 72 returns to its normal state, the steering ECU 12 can be activated to ON quickly.

In the present embodiment, the steering-support-flag setting program of FIG. 4 is executed by the brake ECU 16, and the ON-OFF switching program of FIG. 5 is executed by the steering ECU 12. It may be considered that the steering-support-flag setting program of FIG. 4 and the ON-OFF switching program of FIG. 5 are executed by one or more ECUs of the control device 80.

Figure 6:
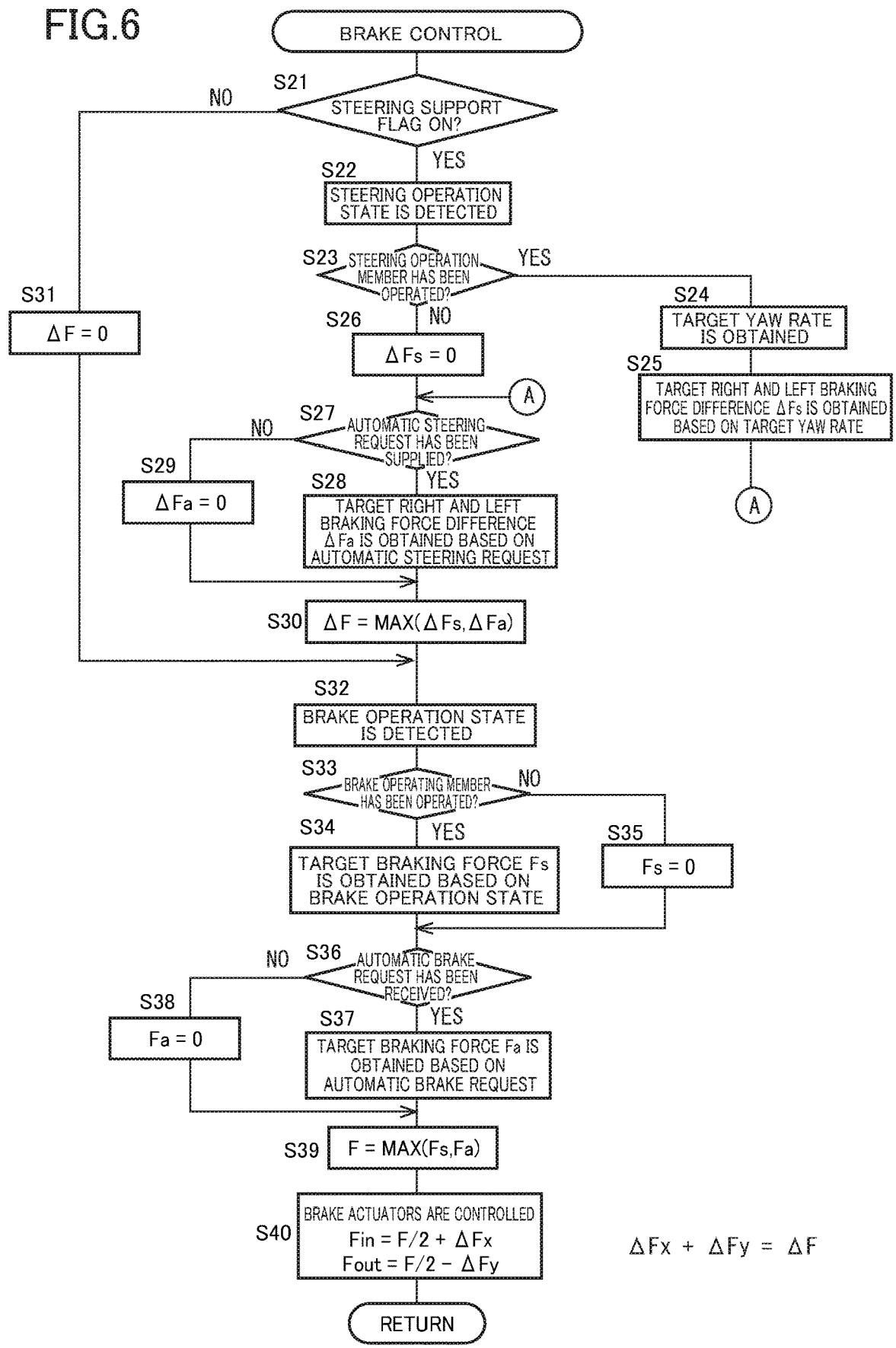
FIG. 6 is a flowchart representing a brake control program stored in a storage of a brake ECU of the control device.

A brake control program represented by a flowchart of FIG. 6 is executed by the brake ECU 16 each time a predetermined time elapses.

Figure 7:
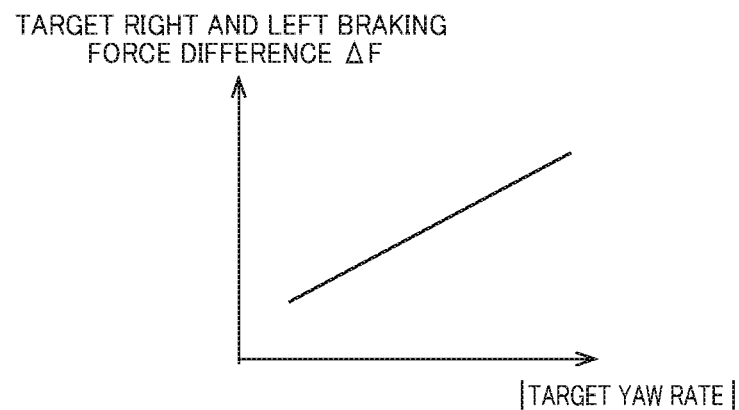
FIG. 7 is a view conceptually illustrating a map for determining a first target right and left braking force difference stored in the storage of the brake ECU.

At S21, it is determined whether the steering support flag is ON. When an affirmative determination (YES) is made at S21, the control flow proceeds to S22 at which the operation state of the steering operation member is obtained based on the detection value of the steering-operation-state detecting device 92. At S23, it is determined whether the steering operation member has been operated. For instance, it is determined that the steering operation member has been operated when an absolute value of the operation amount detected by the steering-operation-state detecting device 92 is not smaller than a set value. When an affirmative determination (YES) is made at S23, a target yaw rate is obtained at S24 based on the operation state of the steering operation member (such as the amount of the operation and the direction of the operation). At S25, a target right and left braking force difference $\Delta Fs$ corresponding to the steering operation is obtained based on the target yaw rate. (Hereinafter, the target right and left braking force difference $\Delta Fs$ corresponding to the steering operation will be referred to as "first target right and left braking force difference $\Delta Fs$" where appropriate.) As illustrated in FIG. 7, the value of the first target right and left braking force difference $\Delta Fs$ is determined to be greater when an absolute value of the target yaw rate is large than when the absolute value of the target yaw rate is small. When it is determined that the steering operation member is not operated, a negative determination (NO) is made at S23. The control flow then proceeds to S26 at which the value of the first target right and left braking force difference $\Delta Fs$ is determined to be 0.

At S27, it is determined whether the automatic steering request has been supplied via the CAN 86. When an affirmative determination (YES) is made at S27, the control flow proceeds to S28 at which a target right and left braking force difference $\Delta Fa$ corresponding to automated driving is obtained based on the automatic steering request. (Hereinafter, the target right and left braking force difference $\Delta Fa$ corresponding to automated driving will be referred to as "second target right and left braking force difference" where appropriate.) When a negative determination (NO) is made at S27, the value of the second target right and left braking force difference $\Delta Fa$ is determined to be 0 at S29. The control flow then proceeds to S30 at which a greater one of the first target right and left braking force difference $\Delta Fs$ and the second target right and left braking force difference $\Delta Fa$ is determined as the target right and left braking force difference $\Delta F$. In a case where the first target right and left braking force difference $\Delta Fs$ and the second target right and left braking force difference $\Delta Fa$ are both 0, the target right and left braking force difference $\Delta F$ is determined to be 0.

When the steering support flag is OFF, a negative determination (NO) is made at S21. The control flow then proceeds to S31 at which the target right and left braking force difference $\Delta F$ is determined to be 0.

The automatic steering request supplied from the automated driving ECU 82 is received by the brake ECU 16 for a time period during which the steering support flag is ON.

At S32, the detection value of the brake-operation-state detecting device 94 is obtained. At S33, it is determined whether the detection value is greater than a set brake operation value to determine whether the brake operating member has been operated. When an affirmative determination (YES) is made at S33, the control flow proceeds to S34 at which a target braking force Fs corresponding to the brake operation is obtained based on the brake operation state. (Hereinafter, the target braking force Fs corresponding to the brake operation will be referred to as "first target braking force Fs" where appropriate.) The value of the first target braking force Fs is determined to be greater when the operation amount of the brake operating member is large than when the operation amount of the brake operating member is small. When a negative determination (NO) is made at S33, the first target braking force Fs is determined to be 0 at S35.

At S36, it is determined whether the automatic brake request has been received. When an affirmative determination (YES) is made at S36, the control flow proceeds to S37 at which a target braking force Fa corresponding to automated driving is obtained based on the automatic brake request. (Hereinafter, the target braking force Fa corresponding to automated driving will be referred to as "second target braking force Fa" where appropriate.) When a negative determination (NO) is obtained at S36, the value of the second target braking force Fa is determined to be 0 at S38. At S39, a greater one of the first target braking force Fs and the second target braking force Fa is determined as the target braking force F. In some cases, the target braking force F is 0.

At S40, the braking force applied to each of the left-side wheels 8L and the braking force applied to each of the right-side wheels 8R are obtained based on the target braking force F determined at S39, the target right and left braking force difference $\Delta F$ determined at S30, the direction of steering, etc. Specifically, there are identified, among the left-side wheels 8L and the right-side wheels 8R, two wheels 8 located on the inner side of a turning path of the vehicle and two wheels 8 located on the outer side of the turning path of the vehicle. The braking forces applied respectively to the front and rear right and left wheels 8 are determined such that a sum Fin of the braking forces applied to the two wheels 8 located on the inner side of the turning path of the vehicle is greater than a sum Fout of the braking forces applied to two wheels 8 located on the outer side of the turning path of the vehicle, by an amount corresponding to the target right and left braking force difference $\Delta F$.

$$Fin = F/2 + Fx$$

$$Fout = F/2 - Fy$$

$$Fin - Fout = Fx + Fy = \Delta F$$

The braking forces applied respectively to the front and rear right and left wheels 8 may be controlled as follows, for instance. On one of the front-wheel side and the rear-wheel side (e.g., on the front-wheel side), the braking force applied to the front right wheel and the braking force applied to the front left wheel are controlled such that a difference therebetween is equal to the target right and left braking force difference $\Delta F$, and the braking force applied to the rear left wheel and the braking force applied to the rear right wheel are controlled to have the same magnitude. Alternatively, the braking forces applied respectively to the front and rear right and left wheels 8 may be controlled such that a sum of: a difference $\Delta Ff$ between the braking force applied to the front left wheel and the braking force applied to the front right wheel; and a difference $\Delta Fr$ between the braking force applied to the rear left wheel and the braking force applied to the rear right wheel, i.e., a sum $\Delta Ff + \Delta Fr$, is brought closer to the target right and left braking force difference $\Delta F$.

In a case where the target braking force F is 0, the braking forces applied to the two wheels located on the inner side of turning path of the vehicle may be controlled such that the sum of those braking forces correspond to the target right and left braking force difference $\Delta F$, and the braking forces applied to the two wheels located on the outer side of the turning path of the vehicle may be controlled such that the sum of those braking forces is equal to 0.

Figure 8:
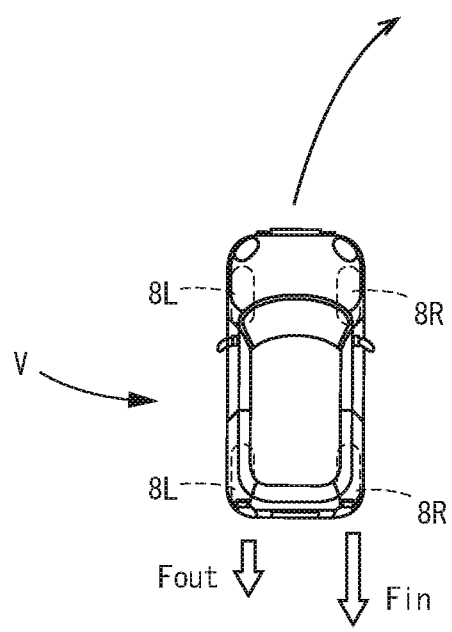
FIG. 8 is a view illustrating a traveling state of a vehicle when the brake control program is executed.

As illustrated in FIG. 8, the braking forces applied respectively to the front and rear right and left wheels 8 are controlled such that the sum Fin of the braking forces applied to the respective two wheels 8R located on the inner side of the turning path of the vehicle V is greater than the sum Fout of the braking forces applied to the respective two wheels 8L located on the outer side of the turning path of the vehicle V, by the amount corresponding to the target right and left braking force difference $\Delta F$, which is determined based on the steering request (the operation steering request or the automatic steering request). Consequently, the vehicle V turns based on the operation steering request or the automatic steering request.

In the brake control program of FIG. 6, the target right and left braking force difference $\Delta F$ is determined in consideration of both the automatic steering request and the operation steering request, namely, the target right and left braking force difference $\Delta F$ is determined based on a greater one of the two steering requests. The present disclosure is not limited to this configuration. For instance, the target right and left braking force difference $\Delta F$ may be determined based on one of the automatic steering request and the operation steering request to which a higher priority is assigned. The same applies to the target braking force. That is, the target braking force F may be determined based on both or one of the automatic brake request and the operation brake request.

To each of the left-side wheels 8L and the right-side wheels 8R, a regenerative braking force by the corresponding in-wheel motor 70 may be applied or a drive force (negative braking force) by the corresponding in-wheel motor 70 may be applied. Controlling the regenerative braking forces and/or the drive forces generated by the in-wheel motors 70 provided for the respective wheels 8 enables the braking force difference between the left-side wheels 8L and the right-side wheels 8R to be brought closer to a target right and left longitudinal force difference. The in-wheel motors 70 of the respective wheels 8 may receive electric power supplied from a power source different from the onboard power source device 4.

The brake system 7 may have any suitable configuration. For instance, the brake actuator 56 may include an electric motor or a hydraulic cylinder. In a case where the brake actuator 56 includes the hydraulic cylinder, the brake system 7 is provided with a hydraulic-pressure control mechanism configured to control a hydraulic pressure of the hydraulic cylinder. In this configuration, the brake actuator 56 is controlled by controlling the hydraulic-pressure control mechanism, so that the braking force applied to the wheel 8 is controlled.

The steering system 5 may have any suitable configuration. For instance, the steering system 5 may include: a steering rod held so as to be movable in the width direction of the vehicle and coupled, via the respective tie rods, to the steerable wheels on one of the front-wheel side and the rear-wheel-side: a steering actuator configured to move the steering rod; and a moving device configured to move the steering rod by driving the steering actuator.

In the abnormal condition of the main power source 72, the steering ECU 12 may be activated to ON while the brake ECU 16 may be deactivated to OFF, and the steering ECU 12 may control the steering devices 10 to thereby apply the braking force to the vehicle. For instance, the steering angle of each of the left-side wheels 8L may be controlled to be equal to 90° in the toe-in direction, and the steering angle of each of the right-side wheels 8R may be controlled to be equal to 90° in the toe-in direction. Thus, the vehicle is brought to a stop.

As described above, the steering ECU 12 and the brake ECU 16 respectively include portions that are mutually substitutable.

It is to be understood that the present disclosure may be embodied with various changes and modifications, which may occur to those skilled in the art.

Claimable Inventions (1) A vehicle system, including:
a steering system including one or more steering actuators configured to steer a plurality of steerable wheels of a vehicle and a steering controller principally constituted by a computer and configured to control the one or more steering actuators to control steering angles of the respective steerable wheels;
a longitudinal-force application system including a plurality of longitudinal-force application actuators configured to apply longitudinal forces respectively to one or more left-side wheels disposed at a left-side portion of the vehicle and one or more right-side wheels disposed at a right-side portion of the vehicle and a longitudinal-force controller principally constituted by a computer and configured to control the longitudinal-force application actuators to control the longitudinal forces applied respectively to the one or more left-side wheels and the one or more right-side wheels; and
an onboard power source device including a main power source and a secondary power source and configured to supply electric power to the longitudinal-force application system and the steering system,
wherein, when the main power source is in an abnormal state in which the main power source fails to supply electric power to the longitudinal-force application system and the steering system, the longitudinal-force controller controls the longitudinal-force application actuators to control a difference between the longitudinal force applied to the one or more left-side wheels and the longitudinal force applied to the one or more right-side wheels, thereby turning the vehicle.

The one or more left-side wheels may include the front left wheel and the rear left wheel or may include one of the front left wheel and the rear left wheel. The same applies to the one or more right-side wheels.

The one or more steering actuators may include a single actuator provided in common to the plurality of steerable wheels or may include a plurality of actuators provided for the respective steerable wheels. In a case where the steering actuator is provided in common to the plurality of steerable wheels, the steerable wheels are steered at the same steering angle by the steering actuator. In a case where the steering actuators are provided for the respective steerable wheels, the steerable wheels may be steered at mutually different steering angles by the corresponding steering actuators.

The steering actuator may include a hydraulic cylinder or may include an electric motor. In a case where the steering actuator includes the hydraulic cylinder, the steering system is provided with a hydraulic-pressure control mechanism configured to control a hydraulic pressure of the steering actuator, and the steering controller may control the hydraulic-pressure control mechanism to thereby control the steering actuator. In a case where the steering actuator includes the electric motor, the steering controller controls a supply current to the electric motor via a drive circuit for the electric motor.

The longitudinal-force application actuator may apply, as the longitudinal force, the braking force or the drive force to the corresponding wheel. The braking force may be a regenerative braking force or a braking force in opposite phase by the in-wheel motor or may be a friction braking force by the friction brake.

(2) The vehicle system according to the form (1), wherein, when the main power source is in the abnormal state, a portion of the steering controller except a communication device thereof is deactivated.

(3) The vehicle system according to the form (1) or (2), further comprising a power-source monitoring device configured to monitor whether the main power source is in the abnormal state,
wherein the steering controller includes a communication device having a function of communicating with the power-source monitoring device, and
wherein a portion of the steering system except the communication device or a portion of the steering controller except the communication device is deactivated when the communication device receives, from the power-source monitoring device, main-power-source abnormality information indicating that the main power source is in the abnormal state.

(4) The vehicle system according to any one of the forms (1) through (3), further comprising a steering-operation-state detecting device configured to detect an operation state of a steering operation member operable by a driver,
wherein the steering-operation-state detecting device is connected to the steering controller and the longitudinal-force controller,
wherein, when the main power source is not in the abnormal state, the steering controller controls the one or more steering actuators based on the operation state of the steering operation member detected by the steering-operation-state detecting device, and
wherein, when the main power source is in the abnormal state, the longitudinal-force controller controls the longitudinal-force application actuators based on the operation state of the steering operation member detected by the steering-operation-state detecting device.

(5) The vehicle system according to any one of the forms (1) through (4), further comprising:
a surrounding information obtaining device configured to obtain information indicating surroundings of the vehicle; and
an automated driving controller configured to obtain a steering request with respect to the steerable wheels based on the information indicating the surroundings of the vehicle obtained by the surrounding information obtaining device,
wherein the steering controller and the automated driving controller are communicably connected to each other, and the longitudinal-force controller and the automated driving controller are communicably connected to each other,
wherein, when the main power source is not in the abnormal state, the steering controller controls the one or more steering actuators based on the steering request obtained by the automated driving controller, and
wherein, when the main power source is in the abnormal state, the longitudinal-force controller controls the longitudinal-force application actuators based on the steering request obtained by the automated driving controller.

The longitudinal-force controller receives the steering request supplied from the automated driving controller for a time period during which the portion of the steering controller except the communication device is in a deactivated (OFF) state.

(6) The vehicle system according to any one of the forms (1) through (5),
wherein the longitudinal-force application actuators are respectively provided for the one or more left-side wheels and the one or more right-side wheels, and
wherein the one or more steering actuators are respectively provided for at least one of the one or more left-side wheels and at least one of the one or more right-side wheels.

It is not necessarily required to provide the steering actuator for each of the front and rear right and left wheels. The steering actuator may be provided for one of: the front right and left wheels; and the rear right and left wheels.

(7) The vehicle system according to any one of the forms (1) through (6),
wherein the longitudinal-force application actuators include: brake actuators respectively provided for the one or more left-side wheels and the one or more right-side wheels and configured to apply braking forces, as the longitudinal forces, respectively to the one or more left-side wheels and the one or more right-side wheels; and drive actuators respectively provided for at least one of the one or more left-side wheels and at least one of the one or more right-side wheels and configured to apply drive forces, as the longitudinal forces, respectively to the at least one of the one or more left-side wheels and the at least one of the one or more right-side wheels, and
wherein the longitudinal-force controller is configured to control the brake actuators, the drive actuators, or the brake actuators and the drive actuators.

Controlling the braking force and/or the drive force applied to each wheel enables the longitudinal force applied to each wheel to be controlled. It is thus possible to control a longitudinal force difference between the one or more right-side wheels and the one or more left-side wheels.

(8) The vehicle system according to any one of the forms (1) through (7),
wherein the longitudinal-force application actuators are brake actuators respectively provided for the one or more left-side wheels and the one or more right-side wheels and configured to apply braking forces, as the longitudinal forces, respectively to the one or more left-side wheels and the one or more right-side wheels,
wherein the longitudinal-force application system is a brake system including friction brakes respectively provided for the one or more left-side wheels and the one or more right-side wheels, each of the friction brakes including a pair of friction pads disposed on opposite sides of a brake rotary member that is rotatable with the wheel and a pressing device configured to press the pair of friction pads against the brake rotary member,
wherein the brake actuators are the pressing devices of the friction brakes, and
wherein the longitudinal-force controller controls the brake actuators to control the braking forces applied respectively to the one or more left-side wheels and the one or more right-side wheels.

In a case where the brake actuator includes an electric motor, the supply current to the electric motor is controlled via a drive circuit for the electric motor, so that the pressing force is controlled to control the braking force. In a case where the pressing device includes a hydraulic cylinder, the brake system is provided with an electromagnetic valve device configured to control a hydraulic pressure of the hydraulic cylinder. In this case, the hydraulic cylinder is controlled by controlling the electromagnetic valve device, so that the hydraulic pressure is controlled.

(9) The vehicle system according to any one of the forms (1) through (8),
wherein the longitudinal-force application actuators are drive actuators configured to apply drive forces, as the longitudinal forces, respectively to at least one of the one or more left-side wheels and at least one of the one or more right-side wheels,
wherein the drive actuators are in-wheel motors respectively provided for the at least one of the one or more left-side wheels and the at least one of the one or more right-side wheels, and
wherein the longitudinal-force controller is configured to control supply currents supplied to the respective in-wheel motors to control the drive forces applied respectively to the one or more left-side wheels and the one or more right-side wheels.

What is claimed is:
1. A vehicle system, comprising:
a steering system including one or more steering actuators configured to steer a plurality of steerable wheels of a vehicle and a steering controller principally constituted by a computer and configured to control the one or more steering actuators to control steering angles of the respective steerable wheels;
a longitudinal-force application system including a plurality of longitudinal-force application actuators configured to apply longitudinal forces respectively to one or more left-side wheels disposed at a left-side portion of the vehicle and one or more right-side wheels disposed at a right-side portion of the vehicle and a longitudinal-force controller principally constituted by a computer and configured to control the longitudinal-force application actuators to control the longitudinal forces applied respectively to the one or more left-side wheels and the one or more right-side wheels; and
an onboard power source device including a main power source and a secondary power source and configured to supply electric power to the longitudinal-force application system and the steering system,
wherein, when the main power source is in an abnormal state in which the main power source fails to supply electric power to the longitudinal-force application system and the steering system, the longitudinal-force controller controls the longitudinal-force application actuators to control a difference between the longitudinal force applied to the one or more left-side wheels and the longitudinal force applied to the one or more right-side wheels, thereby turning the vehicle.

2. The vehicle system according to claim 1, further comprising a power-source monitoring device configured to monitor whether the main power source is in the abnormal state,
wherein the steering controller includes a communication device having a function of communicating with the power-source monitoring device, and
wherein a portion of the steering system except the communication device or a portion of the steering controller except the communication device is deactivated when the communication device receives, from the power-source monitoring device, main-powersource abnormality information indicating that the main power source is in the abnormal state.

3. The vehicle system according to claim 1, further comprising a steering-operation-state detecting device configured to detect an operation state of a steering operation member operable by a driver,
- wherein the steering-operation-state detecting device is connected to the steering controller and the longitudinal-force controller,
- wherein, when the main power source is not in the abnormal state, the steering controller controls the one or more steering actuators based on the operation state of the steering operation member detected by the steering-operation-state detecting device, and
- wherein, when the main power source is in the abnormal state, the longitudinal-force controller controls the longitudinal-force application actuators based on the operation state of the steering operation member detected by the steering-operation-state detecting device.

4. The vehicle system according to claim 1, further comprising:
- a surrounding information obtaining device configured to obtain information indicating surroundings of the vehicle; and
- an automated driving controller configured to obtain a steering request with respect to the steerable wheels based on the information indicating the surroundings of the vehicle obtained by the surrounding information obtaining device,
- wherein the steering controller and the automated driving controller are communicably connected to each other, and the longitudinal-force controller and the automated driving controller are communicably connected to each other,
- wherein, when the main power source is not in the abnormal state, the steering controller controls the one or more steering actuators based on the steering request obtained by the automated driving controller, and
- wherein, when the main power source is in the abnormal state, the longitudinal-force controller controls the longitudinal-force application actuators based on the steering request obtained by the automated driving controller.

5. The vehicle system according to claim 1,
- wherein the longitudinal-force application actuators are brake actuators respectively provided for the one or more left-side wheels and the one or more right-side wheels and configured to apply braking forces, as the longitudinal forces, respectively to the one or more left-side wheels and the one or more right-side wheels,
- wherein the longitudinal-force application system is a brake system including friction brakes respectively provided for the one or more left-side wheels and the one or more right-side wheels, each of the friction brakes including a pair of friction pads disposed on opposite sides of a brake rotary member that is rotatable with the wheel and a pressing device configured to press the pair of friction pads against the brake rotary member,
- wherein the brake actuators are the pressing devices of the friction brakes, and
- wherein the longitudinal-force controller controls the brake actuators to control the braking forces applied respectively to the one or more left-side wheels and the one or more right-side wheels.

\* \* \* \* \*